United States Patent [19]

Yamaguchi

[11] Patent Number: 5,230,533
[45] Date of Patent: Jul. 27, 1993

[54] SHOCK ABSORBING STEERING APPARATUS

[75] Inventor: Mikio Yamaguchi, Takasaki, Japan

[73] Assignee: NSK Ltd., Tokyo, Japan

[21] Appl. No.: 784,884

[22] Filed: Oct. 30, 1991

[30] Foreign Application Priority Data

Nov. 2, 1990 [JP] Japan ............... 2-114723[U]

[51] Int. Cl.$^5$ ............................... B62D 1/19
[52] U.S. Cl. ...................... 280/775; 74/493; 280/777
[58] Field of Search ............ 280/775, 779, 777; 74/492, 493

[56] References Cited

U.S. PATENT DOCUMENTS 4,733,575 3/1988 Nakamura ................ 74/493
4,915,412 4/1990 Yuzuriha et al. ............ 74/493

FOREIGN PATENT DOCUMENTS 61-57462   3/1986  Japan .
61-220965 10/1986  Japan .
63-76578   5/1988  Japan .
1-8454     3/1989  Japan .
1-249571  10/1989  Japan .

Primary Examiner—Karin L. Tyson
Attorney, Agent, or Firm—Shapiro and Shapiro

[57] ABSTRACT

The present invention provides a shock absorbing steering apparatus including a steering column into which a steering shaft is inserted and a support bracket having a support portion for supporting the steering column and an attachment portion to be attached to a vehicle body. A displacement support plate is disposed in front of the support bracket and has one end secured to an outer peripheral surface of the steering column and the other end overlapping with the support portion of the support bracket. The other end of the displacement support plate is integrally connected to the support portion of the support bracket.

16 Claims, 12 Drawing Sheets

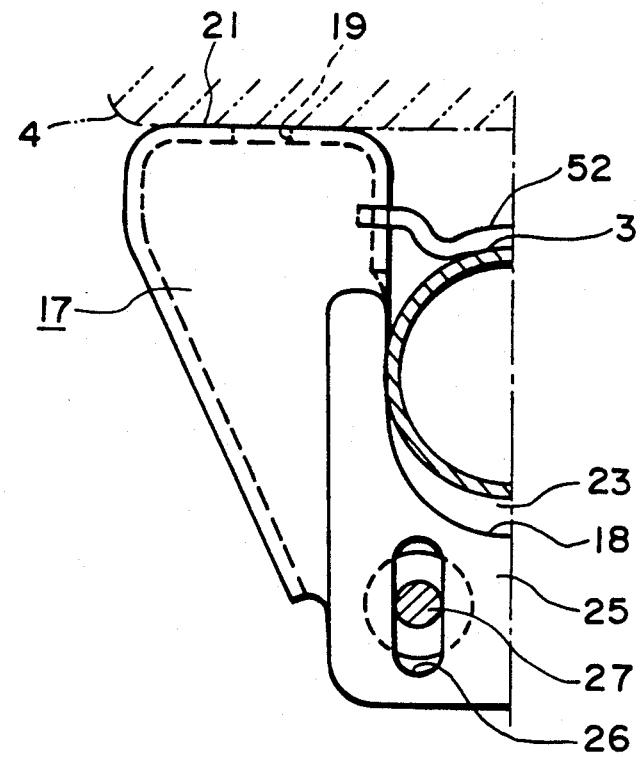
FIG. 2
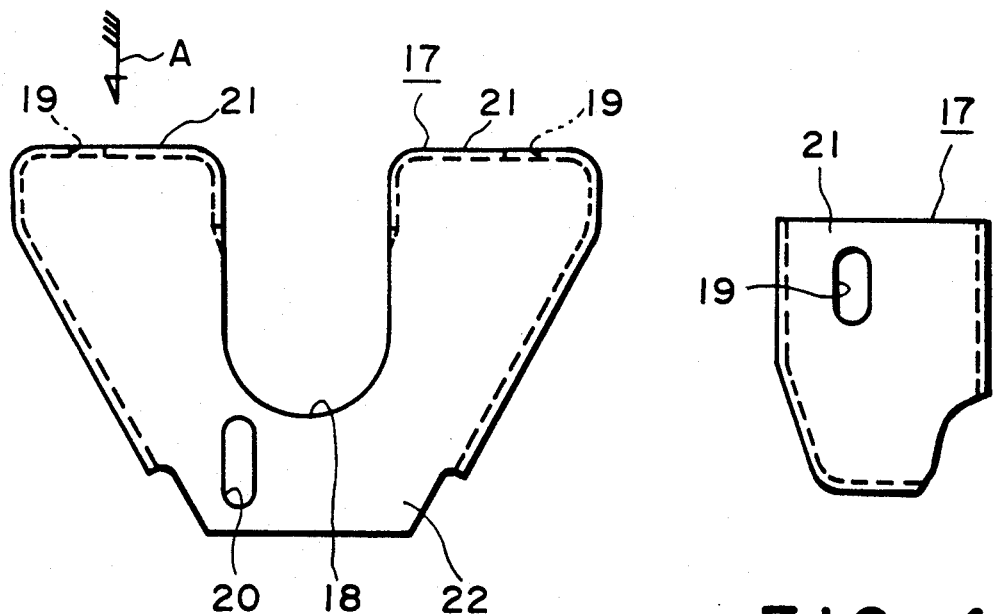
FIG. 3
FIG. 4

SHOCK ABSORBING STEERING APPARATUS

BACKGROUND OF THE INVENTION

1. Field of the Invention

The present invention relates to a shock absorbing steering apparatus which can absorb the shock from a steering column upon the collision of a vehicle to protect a driver or passenger.

2. Related Background Art

Upon the collision of a motor vehicle, subsequent to a so-called primary collision where the motor vehicle strikes against another motor vehicle, there arises a so-called secondary collision where a driver is struck against a steering wheel of the vehicle. In the secondary collision, in order to protect the driver's life by reducing the impact or shock to which the driver is subjected, it has generally been attempted that a steering shaft having one end to which a steering wheel is secured was made collapsible so that the total length of the steering shaft is reduced upon acting the strong impact on the shaft and a steering column through which the steering shaft extends was made of shock absorbing material.

In the past, a shock absorbing steering apparatus used for this purpose is already known, as disclosed in the Japanese Utility Model Laid-Open Appln. No. 63-76578. The details thereof will be described with reference to FIGS. 21 to 24.

In FIG. 21, a steering shaft 201 has a steering wheel 202 attached to an upper end of the shaft so that the steering shaft can be rotated around its own axis when the steering wheel is turned. The steering shaft 201 has a collapsible arrangement (not shown) wherein the total length of the shaft can be reduced when an axial impact is applied to the shaft.

A steering column 203 has a cylindrical body into which the steering shaft 201 is inserted, and the cylindrical body is supported, at its intermediate and lower portions, by a vehicle body 204 such as an undersurface of a dashboard, via upper and lower support brackets 206, 205, respectively. The steering column 203 has also a so-called collapsible arrangement (not shown) wherein the total length of the column can be reduced while absorbing the shock when an axial impact is applied to the column.

The upper support bracket 206 is formed by bending a metal plate and is secured to the outer surface of the steering column 203, for example, by welding. The bracket 206 is provided at its both lateral ends with attachment plate portions 207 by which the upper support bracket 206 is attached to the vehicle body 204. Each attachment plate portion 207 has a U-shaped open slot 208 at its one edge (near the steering wheel 202).

A locking member 209 has a U-shaped body made of synthetic resin and is attached to one edge portion of each attachment plate 207 to cover the slot 208. By tightening a bolt 210 passing through a through hole 215 formed in the locking member 209 and the slot 208 into a threaded hole (not shown) formed in the vehicle body 204, each attachment plate 207 is firmly pinched by the corresponding locking member 209 and the upper support bracket 206 is supported by the vehicle body 204 via the locking members 209.

Further, an energy absorbing member 211 having an intermediate bent portion 212 is attached, at its one end, to each attachment plate portion 207 by welding. The other end of each energy absorbing member 211 is connected to the corresponding locking member 209 via the above-mentioned bolt 210 which also passes through a through hole 216 formed in the energy absorbing member. Each energy absorbing member 211 is made of a plastically deformable sheet plate and its U-shaped intermediate bent portion 212 is pinched by the corresponding attachment plate portion 207 (from above) and a guide plate 213 (from below) which will be described later.

Each guide plate 213 is formed from the sheet metal by press working. The guide plates 213 are secured to the upper support bracket 206 on both sides thereof below the corresponding attachment plate portions 207, by welding, so that a guide space 214 for guiding the bent portion 212 of the energy absorbing member 211 is formed between each guide plate 213 and the corresponding attachment plate portion 207.

With the arrangement as mentioned above, the shock absorbing steering apparatus will be operated as follows, upon the collision of the vehicle.

In the secondary collision due to the vehicle accident, when the impact is transmitted from the driver to the steering wheel 202, the impact or shock is immediately transmitted to the steering column 203, thus pushing the column 203 in its axial direction strongly. In this case, when the axial impact force applied to the steering column 203 becomes greater than friction forces between attachment plate portions 207 and the locking members 209, the bolts 210 are escaped from the corresponding open slots 208 formed in the attachment plate portions 207, so that the steering column 203 can be freely displaced in the axial direction.

As a result, the steering column 203 is shifted in the axial direction (leftwardly and downwardly in FIG. 21) due to the impact force. Consequently, as shown in FIG. 24, each energy absorbing member 211 tends to be extended. In this way, as each energy absorbing member 211 is being extended, the intermediate bent portion 212 is shifted from one end (right end in FIG. 24) of the member connected to the bolt 210 to the other end (left end) connected to the attachment plate portion 207. During this shifting movement of the bent portion, the various portions of the energy absorbing member 211 are plastically deformed, thus absorbing the shock applied to the steering column 203 from the driver via the steering wheel 202.

The conventional shock absorbing steering apparatus having the above-mentioned construction has the following drawback.

In particular, the apparatus is so designed that, upon the occurrence of the secondary collision, the total length of the collapsible steering column 203 is reduced and at the same time the attachment plate portions 207 of the upper support bracket are slipped out of the corresponding locking members 209. However, the forces required for initiating the reduction in length of the steering column and for initiating the relative slippage between the attachment plate portions 207 and the locking members 209 are considerably greater than the forces required after such reduction and the relative slippage have been started. Accordingly, in the conventional apparatus wherein the reduction in length of the steering column 203 and the relative slippage between the attachment plate portions 207 and the locking members 209 are initiated simultaneously, at a moment when the driver is struck against the steering wheel 203, it is feared that the driver is subjected to the great impact force.

In order to reduce the impact force applied to the driver upon the secondary collision as long as possible, it is desired to reduce the force required for initiating the displacement of the steering wheel 202 upon the secondary collision. For this purpose, for example, the Japanese Patent Laid-Open Appln. No. 61-57462 discloses an arrangement wherein a support bracket itself for supportingly connecting a steering column to a vehicle body can be deformed.

However, in this arrangement, since the support bracket having the great rigidity must be deformed, the force required for initiating the displacement of the steering wheel cannot necessarily be reduced sufficiently. But, if the rigidity of the support bracket is merely reduced, the supporting ability of the bracket will be insufficient; thus, this solution cannot be adopted.

SUMMARY OF THE INVENTION

An object of the present invention is to eliminate the above-mentioned conventional drawbacks, and thus, to prevent the great impact from being transmitted from a steering wheel to a driver upon the occurrence of the secondary collision due to the vehicle accident, while maintaining the flexural rigidity of a steering column during the normal operation of the vehicle.

In order to achieve the above object, a shock absorbing steering apparatus according to the present invention comprises a steering column through which a steering shaft having one end to which a steering wheel is secured passes; a support bracket having attachment plate portions by which the support bracket is attached to a body of a vehicle, and a support plate portion which can be deformed in an axial direction of the steering column when a strong axial force is applied to the steering column; a displacement support plate secured to an outer peripheral surface of the steering column and disposed in front of the support plate portion; and a connecting means for connecting a lower portion of the displacement support plate to lower portions of the attachment plate portions.

With this arrangement, when an impact force is applied to the steering column to push the column forwardly due to the secondary collision, the displacement support plate is firstly deformed and then the support plate portion of the support bracket is also deformed forwardly, with the result that the steering column can be displaced forwardly while reducing the length thereof. Now, since the displacement support plate is apt to be deformed, even when the reduction in length of the steering column and the deformation of the displacement support plate are initiated simultaneously, the impact force acting on the driver will be relatively small.

Additionally, since the displacement support plate and the support plate portion of the support bracket can be easily deformed in the axial direction of the steering column but are hard to be deformed in a direction perpendicular to the steering column, the flexural rigidity of the steering column during the normal operation of the vehicle is sufficiently high, thus preventing the vibration of the steering wheel.

According to another aspect of the present invention, a shock absorbing steering apparatus comprises a steering column through which a steering shaft having one end to which a steering wheel is secured passes; a support bracket capable of being secured to a body of a vehicle and having a pair of vertical wall portions each including an inner surface extending in an axial direction of the steering column; a support plate member fixedly provided on the support bracket and extending between rear end edges of the pair of vertical wall portions; a displacement support plate capable of being easily deformed and secured to an outer peripheral surface of the steering column and disposed in front of the support plate member; and a connecting means for connecting an end of the displacement support plate to the support plate member.

With this arrangement, when an impact force is applied to the steering column to push the column forwardly due to the secondary collision, the displacement support plate is firstly deformed and then the support bracket is detached from the vehicle body or the support plate of the support bracket is deformed forwardly, with the result that the steering column can be displaced forwardly while reducing the length thereof. Also in this case, since the displacement support plate is apt to be deformed in the axial direction of the steering column, even when the reduction in length of the steering column and the deformation of the displacement support plate are initiated simultaneously, the impact force acting on the driver will be relatively small.

Further, since the steering column is pinched by the pair of vertical wall portions of the support bracket from left and right directions, the rigidity for preventing the steering column from shifting to the left and right directions is high, thus surely preventing the steering column from shifting to the left and right directions even upon the collision of the vehicle. Accordingly, when an air bag is mounted on the steering wheel, a body of the driver can be received by the air bag without fail.

BRIEF DESCRIPTION OF THE DRAWINGS

FIG. 2 is a view showing a left half of the steering apparatus from the right of FIG. 1;

FIG. 3 is an elevational view of a support bracket from the right of FIG. 1;

FIG. 4 is a view in a direction shown by the arrow A in FIG. 3;

DESCRIPTION OF THE PREFERRED EMBODIMENTS

The present invention will now be explained in connection with embodiments thereof with reference to the accompanying drawings.

Figure 1:
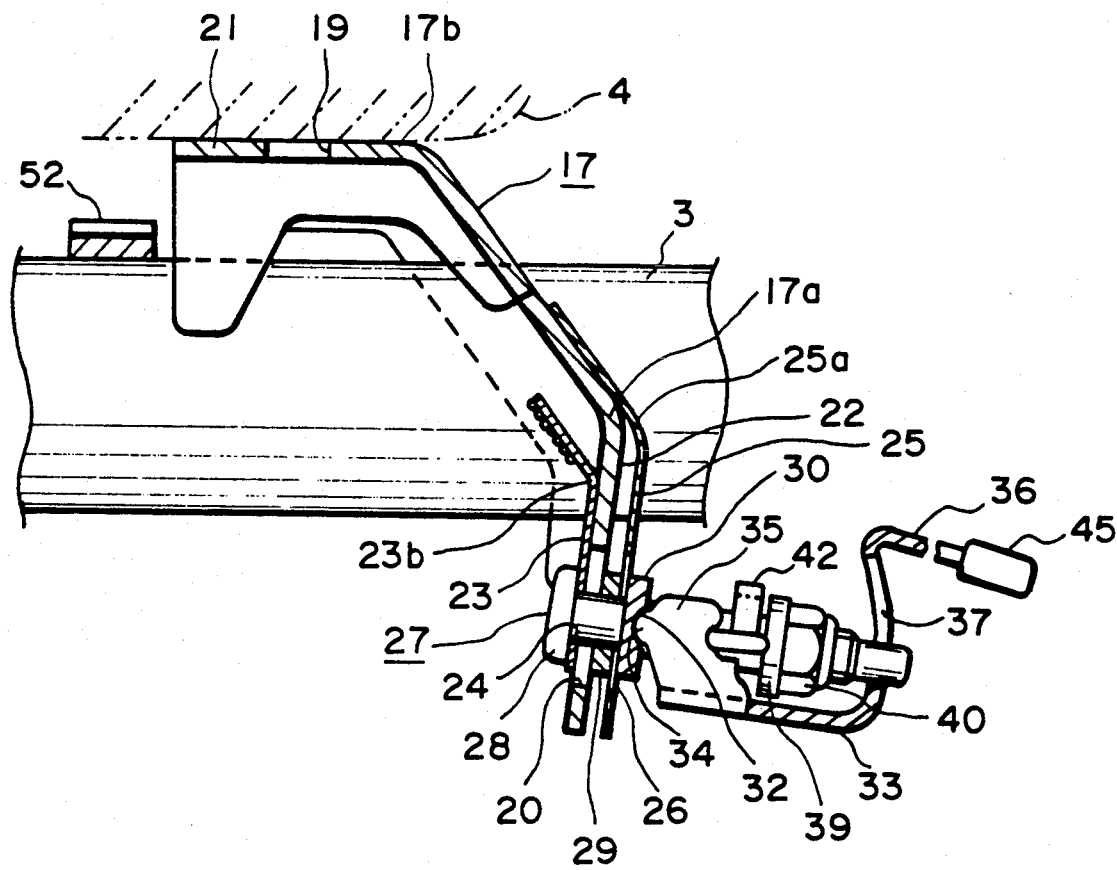
FIG. 1 is an elevational sectional view of a main portion of a shock absorbing steering apparatus according to a first embodiment of the present invention.
Figure 21:
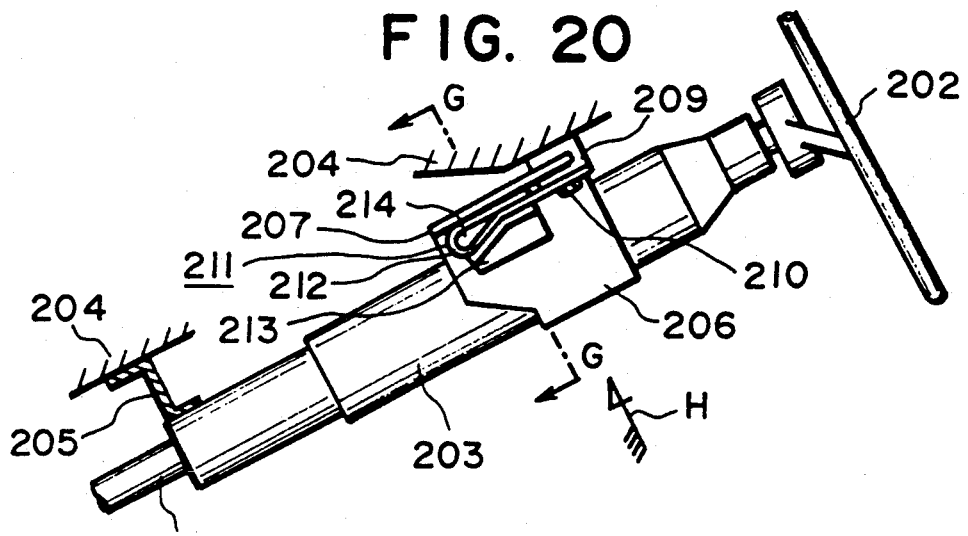
FIG. 21 is an elevational view, in partial section, of a conventional shock absorbing steering apparatus.
Figure 22:
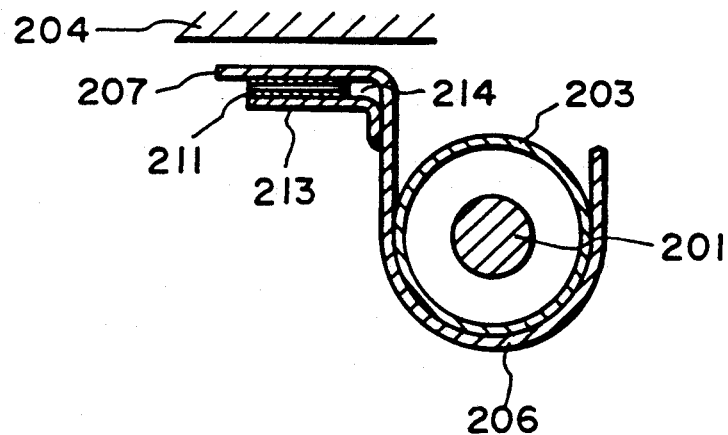
FIG. 22 is a sectional view taken along the lie G—G in FIG. 21.
Figure 23:
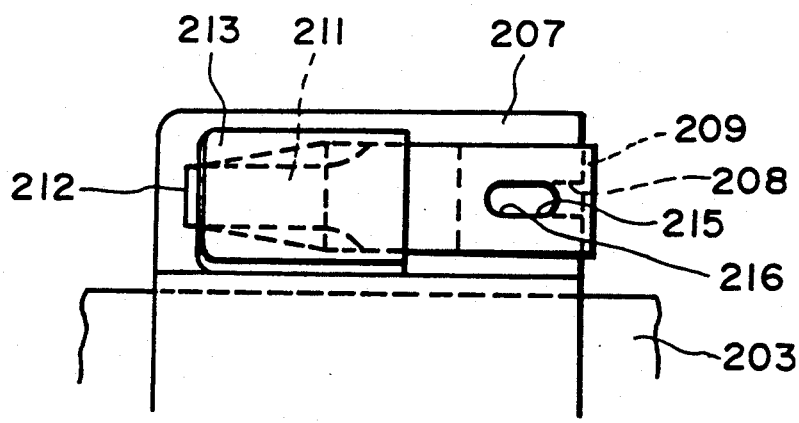
FIG. 23 is a view in a direction of the arrow H in FIG. 21.
Figure 24:
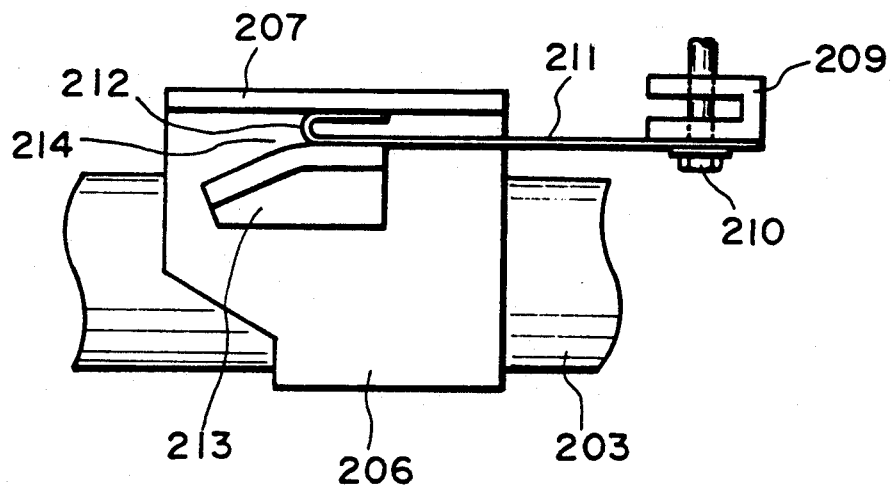
FIG. 24 is an elevational view corresponding to a central portion of FIG. 21, but showing a condition after the shock due to the vehicle collision has been absorbed.

In FIG. 1, a steering column 3 is so designed that it can receive therein a steering shaft (similar to the steering shaft 201 shown in FIG. 21) having a steering wheel (similar to the wheel 202 shown in FIG. 21) at its one end and can be collapsed by the action of an intermediate collapsible structure (not shown) when a strong axial force is applied to the column.

The steering column 3 is supported by a body 4 of a vehicle via a support bracket 17 shown in FIG. 3. The support bracket is formed from a metal plate having high rigidity in an axial direction of the steering column by press working in such a manner that it has a main portion bifurcated by a U-shaped slot 18 having an upper open end and is bent at 17b to form a pair of upper attachment plate portions 21 for attaching the bracket to the vehicle body 4 and is also bent at 17a to form a lower support plate portion 22 for supporting the steering column 3 and for connecting the branched portions of the main portion and accordingly the attachment plate portions. The support bracket is secured to the vehicle body 4, for example, at an undersurface of a dashboard by bolts (not shown) passing through circular holes 19 formed in the respective attachment plate portions 21. Further, the U-shaped slot 18 is positioned at a central portion of the main portion of the support bracket and is partially penetrated into the support plate portion 22. The steering column 3 is passed through the slot 18 in such a manner that it can be displaced in an up-and-down direction. Further, a first elongated slot 20 is formed in a lower portion (i.e., the support plate portion 22) of the support bracket 17, which slot extends in the up-and-down direction and is slightly offset from a centerline of the bracket laterally and forms a part of a height adjusting mechanism which will be described later.

Figure 6:
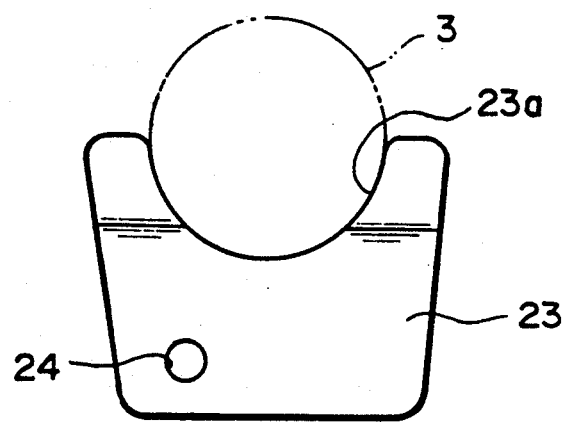
FIG. 6 is an elevational view of a displacement support plate.

As shown in FIG. 6, a displacement support plate 23 having a U-shaped recess 23a and a bent portion 23b is secured to an outer peripheral surface of the steering column 3 at its intermediate portion. The displacement support plate 23 is formed from a relatively thin metal plate by press working, and, therefore, the displacement support plate is more deformable than the support plate portion 22 of the support bracket 17 in the axial direction of the steering column (a direction perpendicular to a plane of FIG. 6). However, the displacement support plate is hard to be deformed in a direction perpendicular to the axial direction of the steering column. Further, a circular hole 24 is formed in the displacement support plate 23 at a position slightly offset from a centerline of this plate laterally, which circular hole is aligned with the first elongated slot 20 of the support plate portion when the parts are assembled.

Referring again to FIGS. 1 and 2, an auxiliary plate 25 made of a thin metal plate is secured to the rear surface of the support bracket in such a manner that there is a clearance between a front surface of the auxiliary plate and a rear surface of the support plate portion 22. A second elongated slot 26 extending in the up-and-down direction is formed in the auxiliary plate 25 to register with the first elongated slot 20 of the support plate portion 22.

A bolt 27 is inserted into the circular hole 24 of the displacement support plate 23 from a forward direction to a rearward direction (from left to right in FIG. 1), and a head 28 of the bolt 27 is secured to the front surface of the displacement support plate 23 by welding and the like. In this condition, the bolt 27 passes through the first and second elongated slots 20, 26 and protrudes from the auxiliary plate 25 rearwardly.

Figure 5:
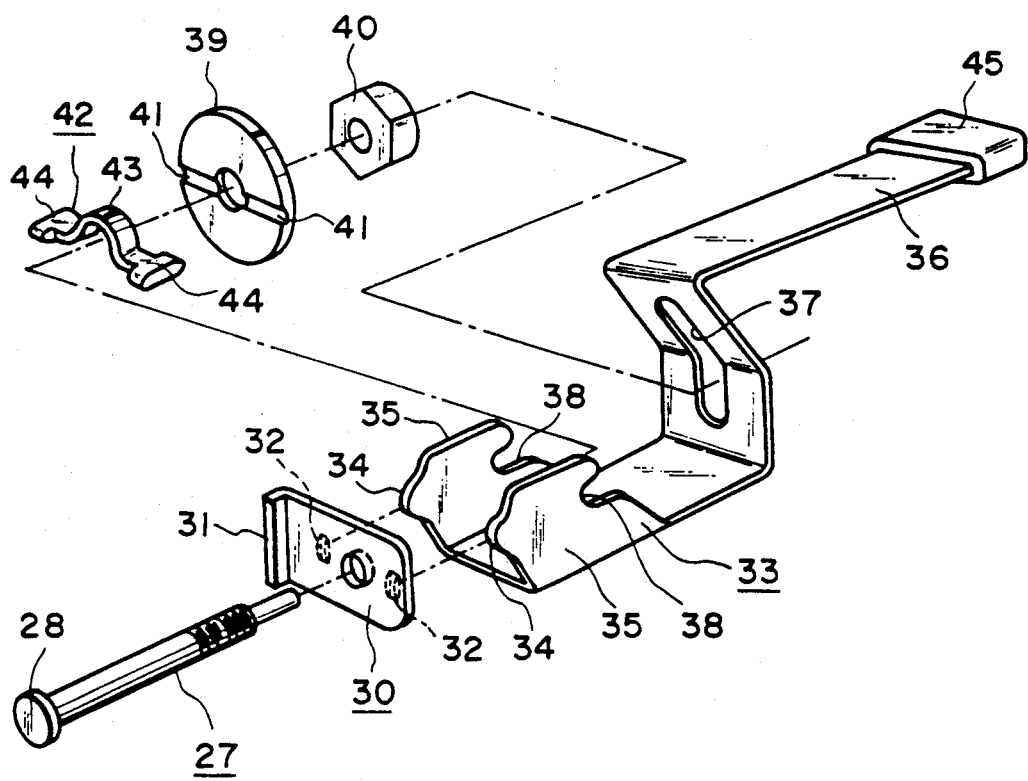
FIG. 5 is an exploded perspective view of a height adjusting mechanism.

Further, an annular spacer 29 is disposed around the bolt 27 between the auxiliary plate 25 and the support plate portion 22, and an urging plate 30 is mounted around the bolt 27 behind the auxiliary plate 25. As shown in FIG. 5, the urging plate 30 is provided at its one lateral edge with a forwardly directing bent portion 31 which will be engaged by an edge of the support plate portion 22 to prevent the rotation of the urging plate around the bolt 27. Further, two arcuate receiving recesses 32 are formed in a rear surface of the urging plate 30, and projections 34 formed on a forward end of an urging member 33 (described later) can be received in the respective recesses 32.

The urging member 33 for urging the urging plate 30 forwardly is formed from a metal plate having the adequate rigidity by press working to take the configuration. Now to be described, a front part of the urging member is formed to define a pair of upright walls 35 spaced apart from each other by a distance capable of receiving the bolt 27 therebetween, and front edges of the walls are protruded forwardly to define the abovementioned arcuate projections 34. Further, arcuate recesses 38 are formed in the rear ends of the walls 35 at their central portions. A rear part of the urging member 33 is firstly bent upwardly and then is bent rearwardly to form a tilt lever 36. In the vicinity of the base of the tilt lever 36, an elongated slot 37 extending in the up-and-down direction is formed in the upwardly bent portion to loosely receive the rear portion of the bolt 27, so that the tilt lever 36 can be rocked within a predetermined range regardless of the existence of the bolt 27.

Further, as shown in FIG. 1, a washer plate 39 is mounted around the bolt 27 and a nut 40 is also threaded on the bolt 27 to urge the washer plate. As shown in FIG. 5, grooves 41 having a semi-circular cross-section and opposed diametrically to each other are formed in a front surface of the washer plate 39, which grooves face to the arcuate recesses 38 of the vertical walls. A link member 42 (described later) disposed and pinched between the grooves 41 and the recesses 38 constitutes a toggle mechanism together with the urging member 33.

As shown in FIG. 5, the link member 42 comprises a central arcuate connection portion 43 and link portions 44 formed on both ends of the connection portion, and can be rotated in a direction opposite to those of the vertical walls 35 when these walls are rocked by operating the tilt lever 36.

A locking member 52 shown in FIGS. 1 and 2 is secured to the upper surface of the steering column 3 at its intermediate portion by welding, and can be abutted, at its both end portions, against the front edges of the support bracket 17 to limit the rearward movement of the steering column 3 when the latter is shifted rearwardly upon the collision of the vehicle.

The shock absorbing steering apparatus having the above-mentioned arrangement operates as follows.

First of all, when the height of the steering wheel is adjusted to suit to the driver's body, a gripper 45 formed on the rear end of the tilt lever 36 is pushed down, thus rocking the urging member 33 integral with the tilt lever 36 in a clockwise direction (FIG. 1). As a result, since the link member 42 is rotated in an anti-clockwise direction, the link portions 44 of the link member 42 and the vertical walls 35 of the urging member 33 which were positioned perpendicularly to each other are inclined with respect to each other, thus releasing the force urging the urging plate 30 forwardly.

Consequently, the bolt 27 which was fixed to the steering column 3 via the displacement support plate 23 can be freely shifted within the first and second elongated slots 20, 26 in the up-and-down direction. Thus, by shifting the steering column 3 in an upward direction or a downward direction via the steering wheel, the driver can adjust the height of the steering wheel.

After the steering wheel is positioned at the desired height, the driver pulls the gripper 45 upwardly. As a result, the link portions 44 of the link member 42 are restored to align with the vertical walls 35 of the urging member, thus urging the urging plate 30 forwardly again, to the position shown in FIG. 1. In this condition, the up-and-down movement of the bolt 27 is prevented by friction forces between the rear surface of the displacement support plate 23 and the front surface of the support plate portion 22, between the front surface of the spacer 29 and the rear surface of the support plate portion 22, between the rear surace of the spacer and the front surface of the auxiliary plate 25, and between the rear surface of the auxiliary plate 25 and the front surface of the urging plate 30. In this way, since the movement of the bolt 27 is prevented by the friction forces acting between the four inter-contacting surfaces, the height position of the steering wheel once set cannot be changed accidentally.

Next, when the impact force is applied to the steering column 3 to shift the latter forwardly due to the secondary collision of the vehicle accident, the displacement support plate 23 secured to the steering column is firstly deformed, thus permitting the forward shifting movement of the steering column 3 while reducing the total length of the column. That is to say, as the steering column 3 is shifted axially forwardly, the displacement support plate 23 will be deformed around the bolt head 28 to which the displacement support plate is secured. Although the displacement support plate 23 is hard to be deformed in the direction perpendicular to the axis of the steering column 3 (up-and-down direction in FIG. 6), it can be easily deformed in the axial direction of the steering column 3 (direction perpendicular to the plane of FIG. 6). Thus, even when the reduction in length of the steering column 3 and the deformation of the displacement support plate 23 are initiated simultaneously, the impact force acting on the driver's body will be relatively small.

When the displacement support plate 23 is deformed to a certain extent and the load in the axial direction of the steering column reaches a predetermined value, the support plate portion 22 of the support bracket 17 starts to be bent or flexed around the bent line 17b, thus further shifting the steering column 3 to absorb the further impact energy. That is to say, since the energy is absorbed by the flexion of the displacement support plate 23 and the support plate portion 22, the great impact does not act on the driver's body upon the collision of the vehicle.

Figure 7:
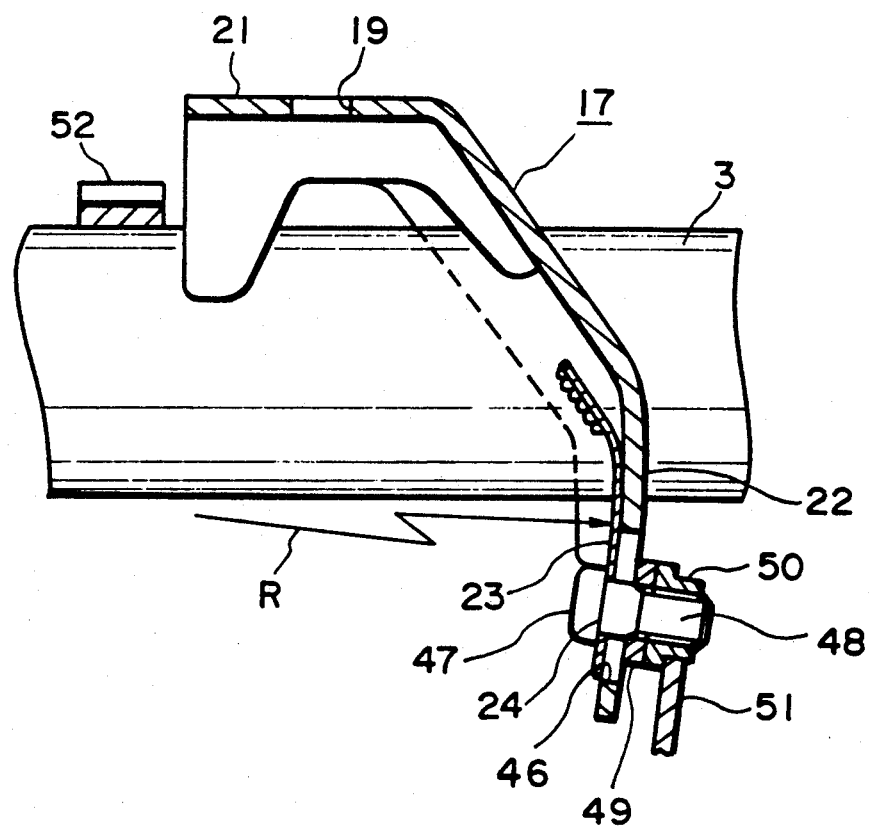
FIG. 7 is an elevational sectional view of a main portion of a shock absorbing steering apparatus according to a second embodiment of the present invention.

Next, a second embodiment of the present invention will be explained with reference to FIG. 7.

In this embodiment, the height adjusting mechanism comprises an elongated slot 46 formed in the support plate portion 22 of the support bracket 17 and extending in an up-and-down direction, a bolt 48 passing through the elongated slot 46 and protruding from the support plate portion 22 rearwardly and having a head 47 secured to the displacement support plate 23, an urging plate 49 mounted around the bolt 48 at a rear side of the support plate portion 22, a nut 50 threaded on the rear portion of the bolt 48, and a tilt lever 51 having a base portion secured to the nut 50 to rotate the latter.

The displacement support plate 23 and the support plate portion 22 of the support bracket 17 each has a curved surface having a radius R of curvature around a tilt center disposed at a lower support for the steering column 3 in order to facilitate the tilting operation. However, it should be noted that the plates 23, 22 need not necessarily have the curved surfaces as shown.

In the illustrated embodiment, when the height of the steering wheel is adjusted to suit to the driver's body, by manipulating the tilt lever 51, the nut 50 is loosened to permit the free movement of the bolt 48 along the elongated slot 46 in the up-and-down direction. Then, by shifting the steering column 3 in an upward direction or a downward direction via the steering wheel, it is possible to adjust the height of the steering wheel.

After the steering wheel is positioned at the desired height, by rotating the tilt lever 51 in the opposite direction, the nut 50 is tightened again to urge the urging plate 49 forwardly. As a result, the up-and-down movement of the bolt 48 is prevented by the friction force between the front surface of the urging plate 49 and the rear surface of the support plate portion 22.

Since the other arrangements and functions in this embodiment are the same as those in the first embodiment, elements the same as or similar to those of the first embodiment are designated by the same reference numerals and the detailed explanation thereof will be omitted.

Figure 8:
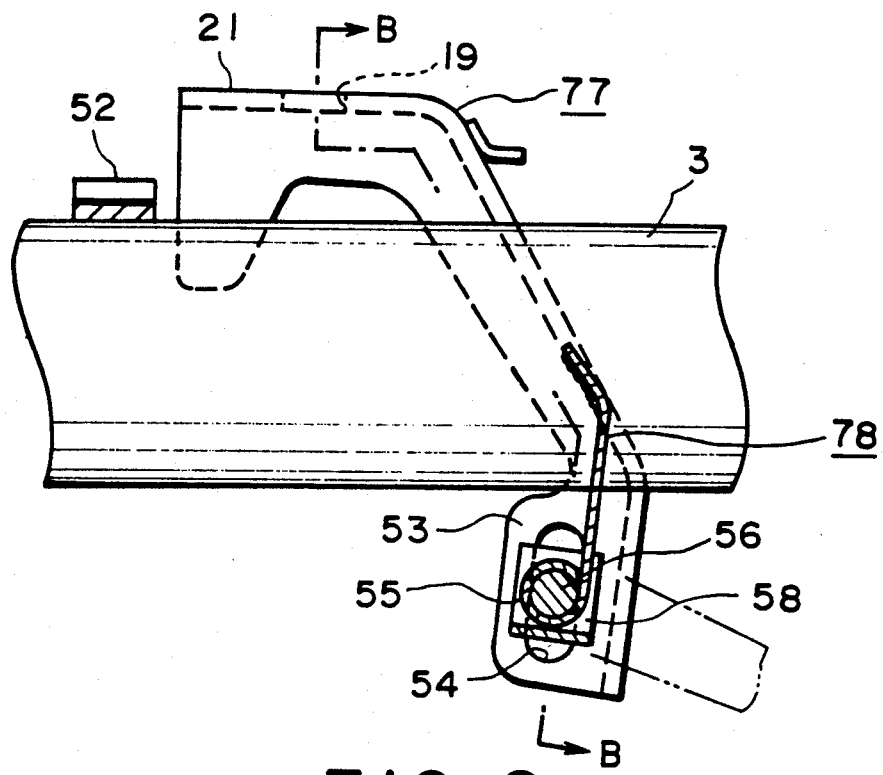
FIG. 8 is an elevational sectional view of a main portion of a shock absorbing steering apparatus according to a third embodiment of the present invention.

Next, a third embodiment of the present invention will be explained with reference to FIGS. 8 to 10.

Figure 10:
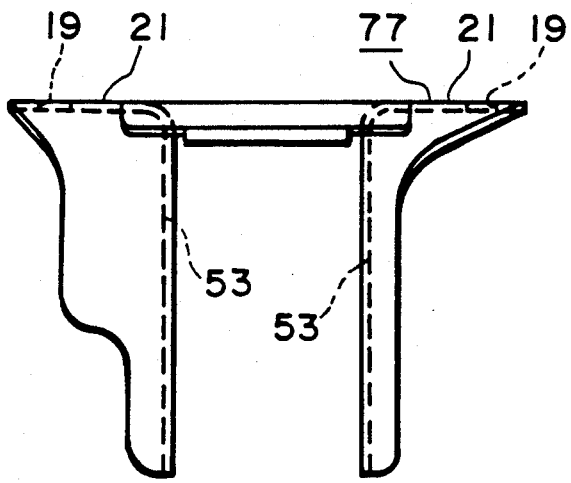
FIG. 10 is an elevational view of a support bracket from the right of FIG. 8.

In this embodiment, a height adjusting mechanism for a steering wheel includes a support bracket 77 provided at its left and right lateral edges with bent plate portions 53, as shown in FIG. 10. An elongated slot 54 extending to an up-and-down direction is formed in each bent plate portion 53. Further, a displacement support plate 78 is secured to a lower outer peripheral surface of the steering column 3 at its central portion, and a cylinder portion 55 is formed on a lower end of the displacement support plate 78, which cylinder portion extends horizontally along the displacement support plate.

Figure 9:
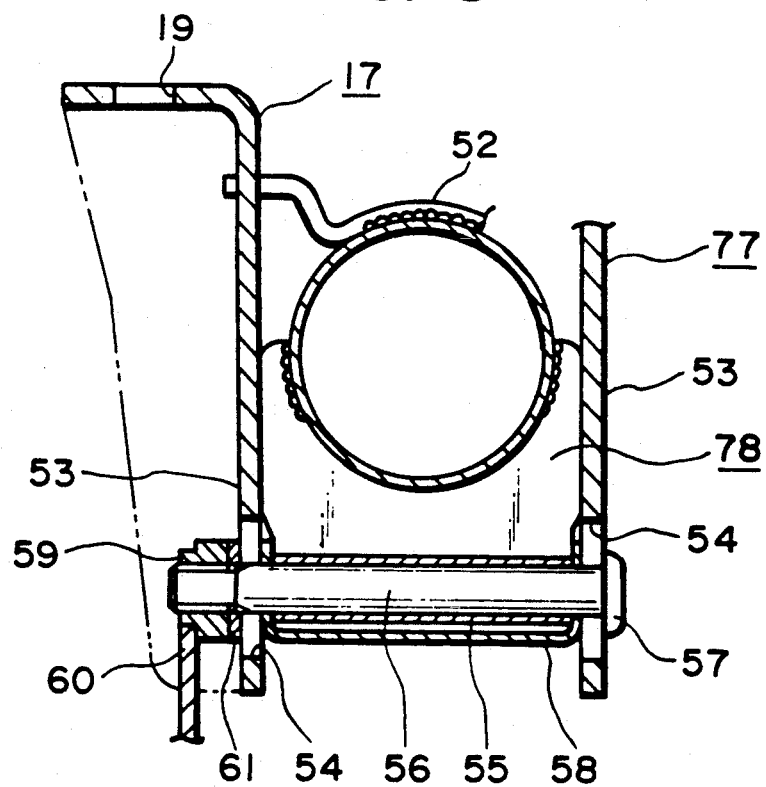
FIG. 9 is a sectional view taken along the line B—B in FIG. 8.

Further, a bolt 56 is inserted into the cylinder portion 55 and into the elongated slots 54 in such a manner that it cannot be rotated around its own axis but can be shifted along its own axial direction (left-and-right direction in FIG. 9). Incidentally, in order to prevent the rotation of the bolt 56, any conventional means may be used. For example, by engaging a portion of a head 57 of the bolt 56 by the elongated slot 54, the rotation of the bolt can be prevented. Further, in the illustrated embodiment, a spacer member 58 having a U-shaped body is mounted on the cylinder portion 55, and both end portions of the spacer member 58 are pinched between the respective ends of the cylinder portion 55 and the respective bent plate portions 53.

Further, a free end of the bolt 56 is protruded from one of the bent plate portions 53, and a nut 59 is threaded on the free end of the bolt 56. Thus, the cylinder portion 55 and the spacer member 58 are sandwiched by the pair of bent plate portions 53 with the aid of the nut 59 and the bolt head 57 protruding from the other bent plate portion. In addition, a washer plate 61 is disposed between an inner surface of the nut 59 and an outer surface of one of the bent plate portions 53. A base of a tilt lever 60 is secured to the nut 59 so that the nut 59 can be rotated by manipulating the tilt lever.

In this embodiment, when the height of the steering wheel is adjusted to suit to the driver's body, by manipulating the tilt lever 60, the nut 59 is loosened so that the bolt 56 can be shifted in the up-and-down direction within the pair of elongated slots 54.

After the steering wheel is positioned at the desired height, by rotating the tilt lever 60 in the opposite direction, the distance between the nut 59 and the head 57 of the bolt 56 is decreased, with the result that the bolt 56 is prevented from shifting in the up-and-down direction by friction forces generated between both lateral surfaces of the spacer member 58 and the inner surfaces of the pair of bent plate portions 53.

Conversely, the illustrated embodiment, the arrangement may also be so designed that the nut 59 is shiftable along the elongated slot 54 but is held in non-rotating condition and the bolt 56 is rotated by the tilt lever 60.

Further, in the illustrated embodiments, while the apparatus included the height adjusting mechanism, if the height adjusting mechanism is not needed, a lower end of the displacement support plate may be merely welded to a lower end of the support bracket.

FIGS. 11 to 14 show a fourth embodiment of the present invention. In FIGS. 11-14, a steering column 103 is so designed that it can receive a steering shaft (similar to the steering shaft 201 shown in FIG. 21) having a steering wheel (similar to the wheel 202 shown in FIG. 21) at its one end and can be collapsed by the action of an intermediate collapsible structure (not shown) when a strong axial force is applied to the column.

A support bracket 107 having the rigidity sufficient to support the steering column 103 from a body of a vehicle is formed from a metal plate by press working in such a manner that it has attachment plate portions 118 on both sides of an upper end of the bracket. The support bracket 117 is supported by a portion of the vehicle body (similar to the vehicle body 204 in FIG. 21) such as an undersurface of a dashboard. Although a structure for attaching the attachment plate portions 118 to the vehicle body 204 may be one of any conventional structures which are well-known, it should be noted that such structure is so designed that, when the strong force is applied to the steering column 103 in its axial direction (left in FIG. 11), the attachment plate portions 118 are disengaged from the vehicle body 204 to permit the free movement of the support bracket 117 with respect to the vehicle body.

Figure 11:
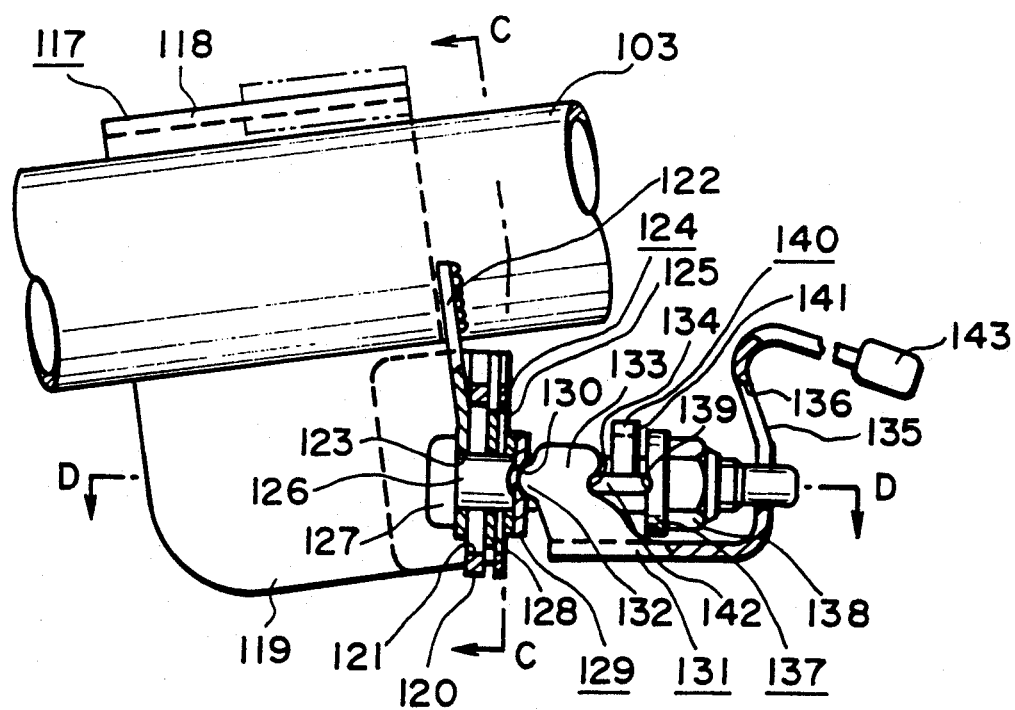
FIG. 11 is an elevational sectional view of a main portion of a shock absorbing steering apparatus according to a fourth embodiment of the present invention.
Figure 12:
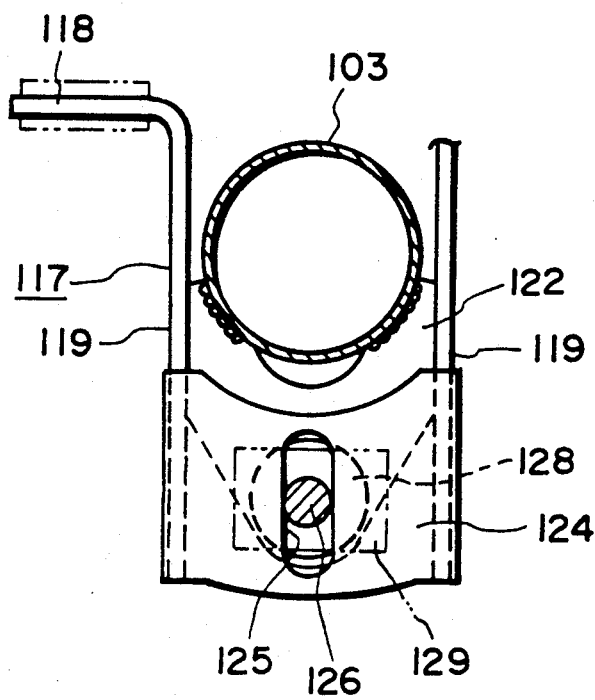
FIG. 12 is a sectional view taken along the line C—C in FIG. 11.

As shown in FIG. 12, below each of the attachment plate portions 118, a vertical wall portion 119 bent downwardly at a right angle from an inner edge of the corresponding attachment plate portion 118 is formed. Inner surfaces of the vertical wall portions 119 are parallel with each other and extend along an axis of the steering column 103. Further, rear edge portions of the paired vertical wall portions 119 (rear end edges as considered in a direction opposite to a forward running direction of the vehicle, i.e., right end edges in FIG. 11) have a connecting wall portion 120 at their lower halves, which connecting wall portion acts as a support plate member for supporting the steering column 103. Further, an elongated slot 121 extending in the up-and-down direction is formed in the connecting wall portion 120 at its central position.

A displacement support plate 122 is attached to the outer peripheral surface of the steering column 103 at its intermediate portion by welding. The displacement support plate 122 is formed from a relatively thin metal plate by press working so that it can be easily deformed in the axial direction of the steering column but is hard to be deformed in a direction perpendicular to the column axis (left-and-right direction in FIG. 12). Further, a circular hole 123 is formed in a lower portion of the displacement support plate 122 at its central position, which hole can be aligned with the elongated slot 121 during assembling the apparatus.

Figure 13:
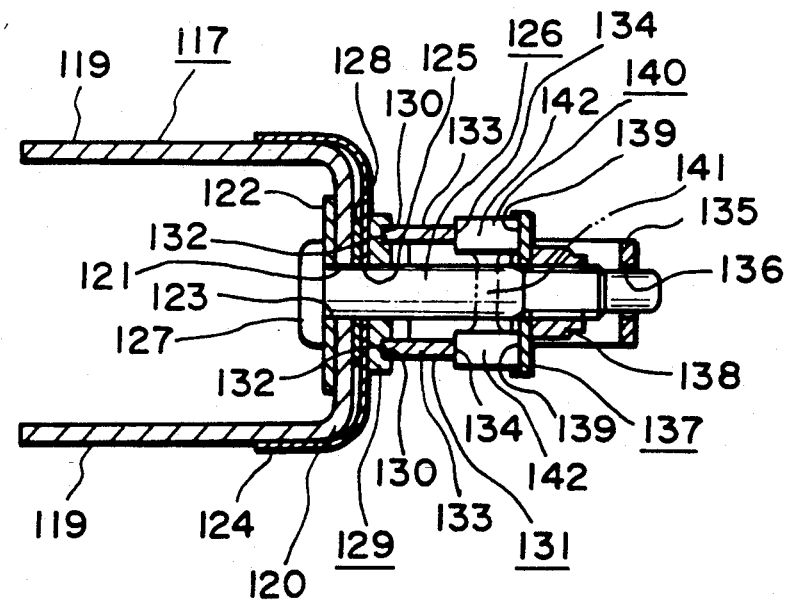
FIG. 13 is a sectional view taken along the line D—D in FIG. 11.

As shown in FIG. 13, an auxiliary plate 124 made of a thin metal plate is secured to a rear surface of the connecting wall portion 120 of the support bracket 117 so that a space is formed between a front surface of the auxiliary plate 124 and a rear surface of the connecting portion 120. More particularly, the auxiliary plate 124 is secured to the rear surface of the connecting wall portion 120 by abutting both inner end surfaces of the U-shaped auxiliary plate 124 against outer surfaces of the paired vertical wall portions 119 and by connecting these inter-contacting surfaces of each other by spot welding. A second elongated slot 125 extending to the up-and-down direction is formed in the auxiliary plate 124 to align with the elongated slot 121.

A bolt 126 is inserted into the circular hole 123 from forward to rearward, and a head 127 of the bolt 126 is secured to the front surface of the displacement support plate 122 by welding and the like. In this condition, the bolt 126 passes through the elongated slot 121 and the second elongated slot 125 and protrudes from the auxiliary plate 124 rearwardly.

Further, an annular spacer 128 is disposed around the bolt 126 between the auxiliary plate 124 and the connecting plate portion 120, and an urging plate (pinching member) 129 is mounted around the bolt 126 behind the auxiliary plate 124. Two arcuate receiving recesses 130 are formed in a rear surface of the urging plate 129, and projections 132 formed on a forward end of an urging member 131 (described later) can be received in the respective recesses 130.

Figure 14:
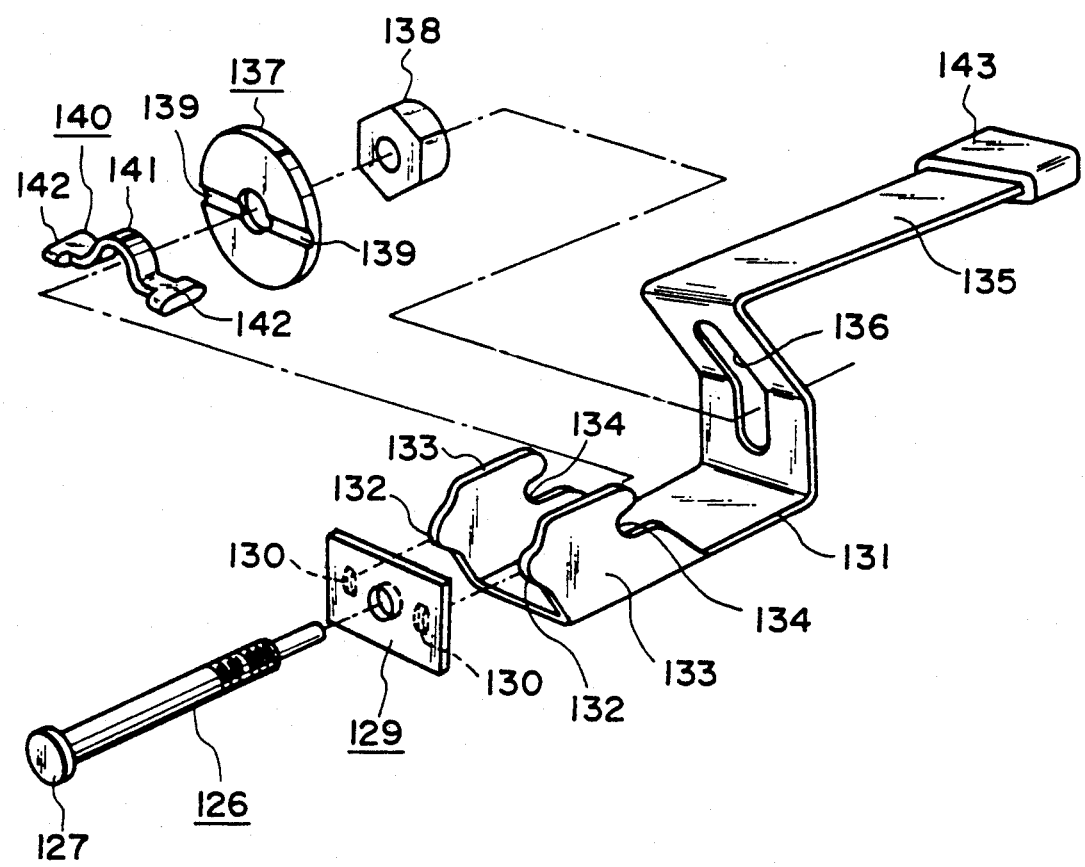
FIG. 14 is an exploded perspective view of a height adjusting mechanism.
Figure 15:
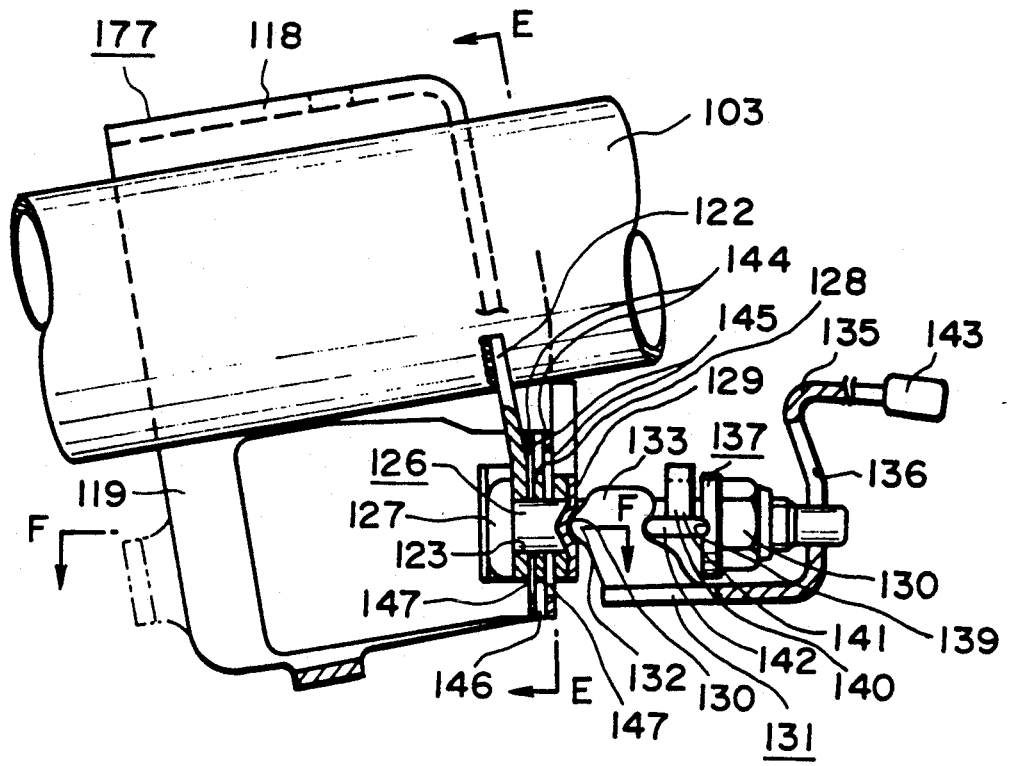
FIG. 15 is an elevational sectional view of a main portion of a shock absorbing steering apparatus according to a fifth embodiment of the present invention.
Figure 16:
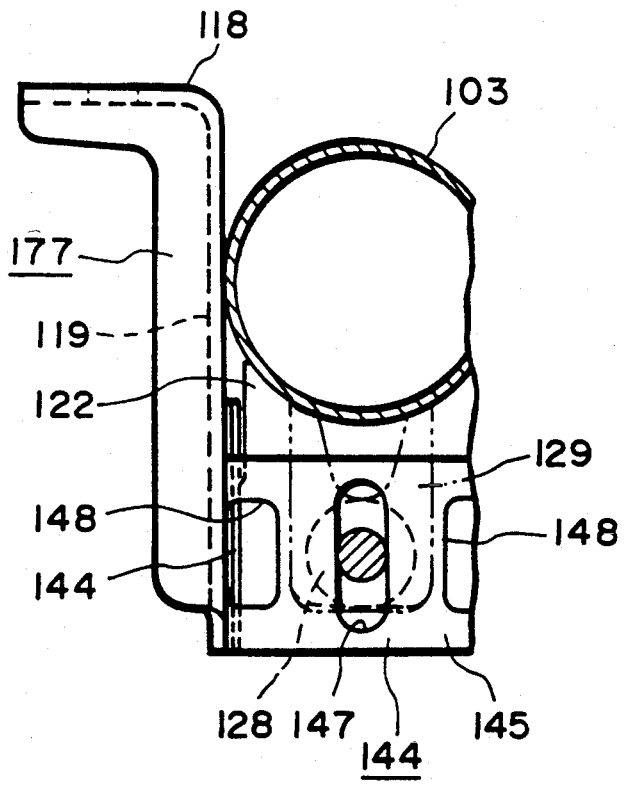
FIG. 16 is a sectional view taken along the line E—E in FIG. 15.
Figure 17:
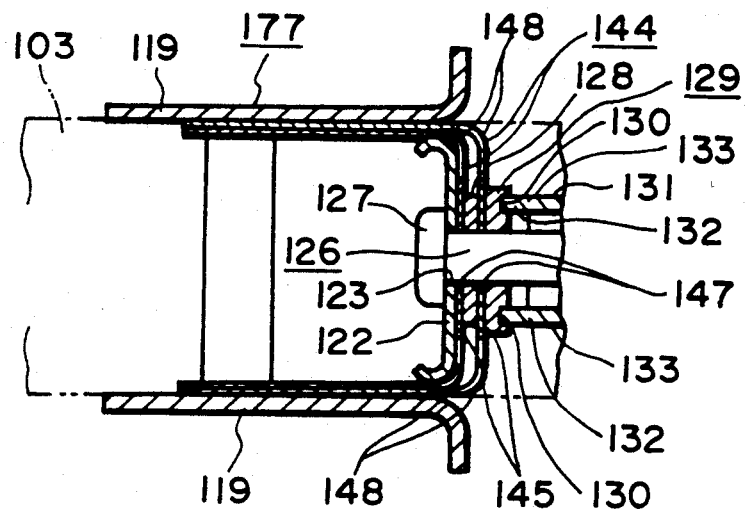
FIG. 17 is a sectional view taken along the line F—F in FIG. 15.

The urging member 131 for urging the urging plate 129 forwardly is formed from a metal plate having the adequate rigidity by press working to take the as shown in FIG. 14. More particularly, a front part of the urging member is formed to define a pair of upright walls 133 spaced apart from each other by a distance capable of receiving the bolt 126 therebetween, and front edges of the walls are protruded forwardly to define the above-mentioned arcuate projections 132. Further, arcuate recesses 134 are formed in the rear ends of the walls 133 at their central portions.

A rear part of the urging member 131 is firstly bent upwardly and then is bent rearwardly to from a tilt lever 135. In the vicinity of the base of the tilt lever 135, an elongated slot 136 extending in the up-and-down direction is formed in the upwardly bent portion to loosely receive the rear portion of the bolt 126, so that the tilt lever 135 can be rocked within a predetermined range regardless of the existence of the bolt 126.

Further, a washer plate 137 is mounted around the bolt 126 and a nut 138 is also threaded on the bolt 126 to urge the washer plate. Grooves 139 having a semi-circular cross-section and opposed diametrically to each other are formed in a front surface of the washer plate 137, which grooves face to the arcuate recesses 134 of the vertical walls. A link member 140 disposed and pinched between the grooves 139 and the recesses 134 constitutes a toggle mechanism together with the urging member 131.

The link member 140 comprises a central arcuate connection portion 141 and link portions 142 formed on both ends of the connection portion, and can be rotated in a direction opposite to those of the vertical walls 133 when these walls are rocked by operating the tilt lever 135.

Next, an operation of the shock absorbing steering apparatus according to this embodiment will be explained.

First of all, when the height of the steering wheel is adjusted to suit to the driver's body, a gripper 143 formed on the rear end of the tilt lever 135 is pushed down, thus rocking the urging member 131 integral with the tilt lever 135 in a clockwise direction (FIG. 11). As a result, since the link member 140 is rotated in an anti-clockwise direction, the link portions 142 of the link member 140 and the vertical walls 133 of the urging member 131 which were positioned perpendicularly to each other are inclined with respect to each other, thus releasing the force urging the urging plate 129 forwardly.

Consequently, the bolt 126 which was fixed to the steering column 103 via the displacement support plate 122 can be freely shifted within the first and second elongated slots 121, 125 in the up-and-down direction. Thus, by shifting the steering column 103 in an upward direction or a downward direction via the steering wheel, the dirver can adjust the height of the steering wheel. Incidentally, in order to ensure the smooth shifting movement of the bolt 126 in the up-and-down direction in this condition, the connecting wall portion 120 and the auxiliary plate 124 have substantially circular cross-sections having a center of curvature at the tilt center of the steering column 103 (a pivot axis at a front end of the steering column 103).

After the steering wheel is positioned at the desired height, the driver pulls the gripper 143 upwardly. As a result, the link portions 142 of the link member 140 are restored to align with the vertical walls 133 of the urging member 131, thus urging the urging plate 129 forwardly again, as shown in FIG. 11. In this condition, the up-and-down movement of the bolt 126 is prevented by friction forces between the rear surfaces of the displacement support plate 122 and the front surface of the connecting wall portion 120, between the front surface of the spacer 128 and the rear surface of the connecting wall portion 120, between the rear surface of the spacer and the front surface of the auxiliary plate 124, and between the rear surface of the auxiliary plate 124 and the front surface of the urging plate 129. In this way, since the movement of the bolt 126 is prevented by the friction forces acting between the four inter-contacting surfaces, the height position of the steering wheel once set cannot be changed accidentally.

Next, when the impact force is applied to the steering column 103 to shift the latter forwardly due to the secondary collision of the vehicle accident, the displacement support plate 122 is firstly deformed in the axial direction of the steering column, thus permitting the forward shifting movement of the steering column 103 while reducing the total length of the column. That is to say, as the steering column 103 is shifted axially forwardly, the displacement support plate 122 will be deformed around the bolt head 127 to which the displacement support plate is secured.

Although the displacement support plate 122 made of a relatively thin metal plate is hard to be deformed in the direction perpendicular to the axis of the steering column 103, it can be easily deformed in the axial direction of the steering column. Thus, even when the reduction in length of the steering column 103 and the deformation of the displacement support plate 122 are initiated simultaneously, the impact force acting on the driver's body will be relatively small.

When the displacement support plate 122 is deformed to a certain extent and the load in the axial direction of the steering column reaches a predetermined value, the attachment plate portions 118 are disengaged from the vehicle body 204 and the support bracket 117 is disconnected from the vehicle body, thus further shifting the steering column 103 to absorb the impact energy adequately. That is to say, since the reduction in length of the steering column 103 has already been started before the support bracket 117 is disengaged from the vehicle body 204, the great impact does not act on the driver's body upon the collision of the vehicle.

Further, since the steering column 103 is sandwiched by the pair of left and right vertical wall portions 119 of the support bracket 117, the rigidity for preventing the movement of the steering column 103 in the left-and-right direction is great, and thus, it is possible to prevent the left-and-right movement of the steering column 103 even upon the collision of the vehicle.

Accordingly, if an air bag is mounted on the steering wheel, the driver's body can be surely supported by the air bag, thus protecting the driver without fail.

Next, a fifth embodiment of the present invention will be explained with reference to FIGS. 15 to 18.

In this embodiment, a support bracket 177 is secured to a vehicle body (similar to the body 204 shown in FIG. 21) in such a manner that the bracket is not disengaged from the vehicle body even if the collision of the vehicle occurs, and a shock absorbing mechanism for permitting an axial displacement of a steering column 103 while absorbing the impact energy generated by the vehicle collision is disposed between the support bracket 177 and a displacement support plate 122.

The connecting wall portion 120 (FIGS. 11 and 12) in the above-mentioned fourth embodiment is omitted from the support bracket 177, and, alternatively, a pair of curling plates 144 acting as a support plate member are formed between the vertical wall portions 119 of the support bracket 177.

Each curling plate 144 has a U-shaped body made of a thin metal plate. Front end portions of the curling plates are secured to inner surfaces of the vertical wall portions 119 by spot welding and the like, and a space 146 is formed between base portions 145 formed at intermediate areas of the curling plates 144.

An elongated slot 147 extending in an up-and-down direction is formed in each curling plate 144 at its central position. Further, a bolt 126 inserted, from forward, into a circular hole 123 formed in a lower portion of the displacement support plate 122 and passes through the elongated slots 147. A spacer 128 is mounted around the bolt 126 between the pair of base portions 145. Further, an urging plate 129 cooperates with the spacer 128 to pinch the rear base portion 145 therebetween and has a bifurcated upper portion, upper ends of which are abutted against the lower surface of the steering column 103.

In this embodiment, the other arrangements and the operation for adjusting the height of the steering wheel to suit to the driver's body are the same as those in the aforementioned fourth embodiment.

When the impact force is applied to the steering column 103 to shift the latter forwardly due to the secondary collision of the vehicle accident, the displacement support plate 122 is firstly deformed in the axial direction of the steering column, thus permitting the forward shifting movement of the steering column 103 while reducing the total length of the column, with the result that the impact force acting on the driver's body is suppressed to the minimum extent.

Figure 18:
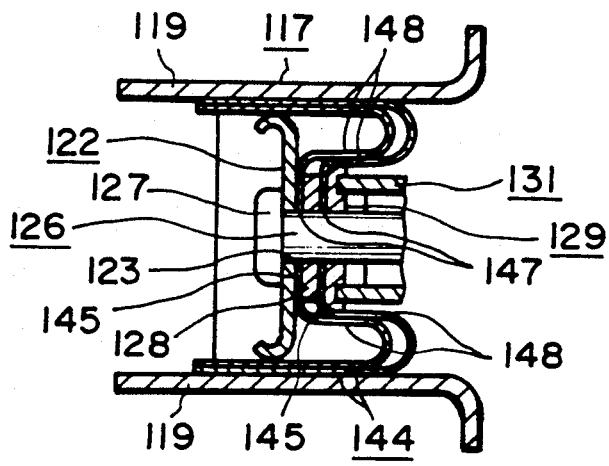
FIG. 18 is a sectional view similar to FIG. 17, but showing a deformed condition caused by the collision of a vehicle.

When the displacement support plate 122 is deformed to a certain extent and the load in the axial direction of the steering column reaches a predetermined value, the curling plates 144 start to be deformed as shown in FIG. 18, thus further shifting the steering column 103 to which the displacement support plate 122 is secured forwardly while absorbing the impact energy due to the collision. Incidentally, in the illustrated embodiment, through holes 148 are formed in the respective curling plates 144 at areas which correspond to both ends of the base portions 145 during the normal operation of the vehicle (i.e., before the collision of the vehicle occurs), so that the force required for initiating the deformation of the curling plates 145 is reduced. As a result, even though the support bracket 177 is not disengaged from the vehicle body, the driver is not subjected to the strong impact force.

Figure 19:
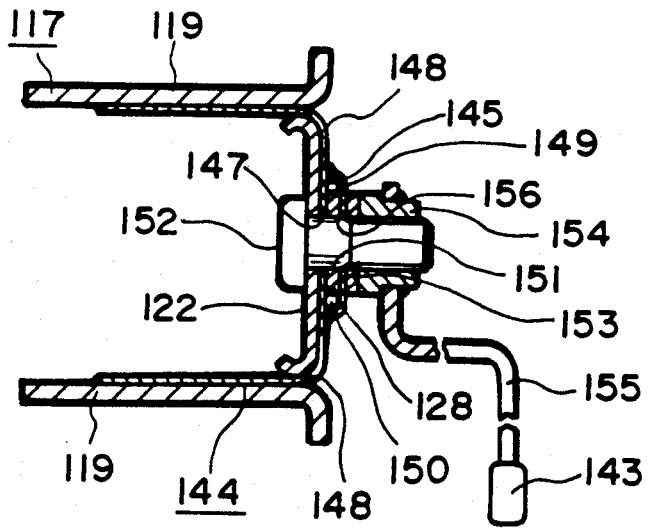
FIG. 19 is an elevational sectional view of a main portion of a shock absorbing steering apparatus according to a sixth embodiment of the present invention.

Next, a sixth embodiment of the present invention shown in FIG. 19 will be explained.

In this embodiment, only a single curling plate 144 is used to connect a displacement support plate 122 to a support bracket 117 with the shock absorbing ability. A splice plate 149 is welded to a rear surface of a base portion 145 of the single curling plate 144 at its central position in such a manner that a space 150 extending in up-and-down direction (perpendicular to the plane of FIG. 19) is created between a front surface of the splice plate 149 and a rear surface of the base portion 145. The spacer 128 is inserted within the space 150 without any play, and a bolt 152 secured to the displacement support plate 122 is inserted into a circular hole 151 formed in the spacer 128. On a free end of the bolt 152 protruding from the rear surface of the splice plate 149, a washer 153 is mounted and further a nut 154 is threaded on the bolt behind the washer. A base end of a tilt lever 155 is secured to the nut 154 so that the nut 154 can be loosened or tightened by manipulating the tilt lever 155.

In this embodiment, when the height of the steering wheel is adjusted to suit to the driver's body, by manipulating the tilt lever 155, the nut 154 is loosened so that the bolt 152 can be shifted in the up-and-down direction within the elongated slots 147, 156 formed in the curling plate 144 and the splice plate 149, respectively. Thus, by shifting the steering column 103 in an upward direction or a downward direction via the steering wheel, the driver can adjust the height of the steering wheel.

After the steering wheel is positioned at the desired height, by rotating the tilt lever 155 in the opposite direction, the nut 154 is tightened. As a result, the up-and-down movement of the bolt 152 is prevented by friction forces between the front surface of the washer 153 and the rear surface of the splice plate 149, between the rear surface of the spacer 128 and the front surface of the splice plate 149, between the front surface of the spacer and the rear surface of the base portion 145 of the curling plate 144, and between the front surface of the base portion 145 and the rear surface of the displacement support plate 122.

The other arrangements and functions are the same as those in the above-mentioned fifth embodiment.

Figure 20:
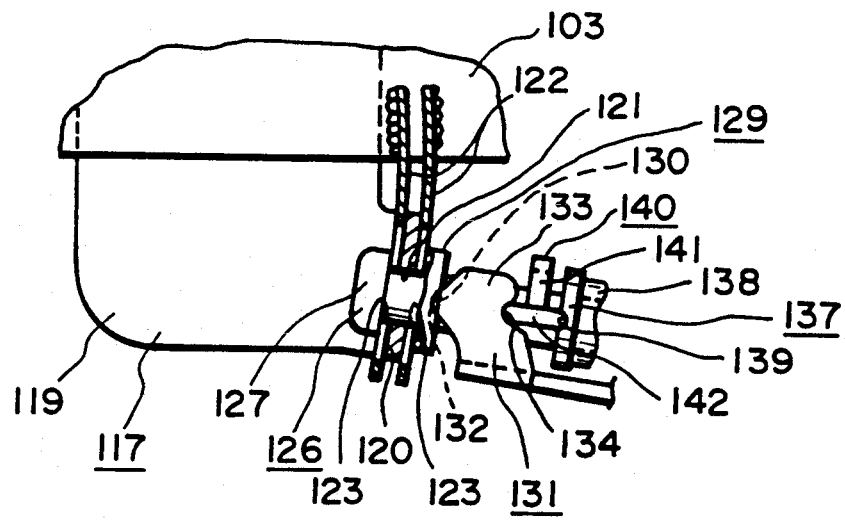
FIG. 20 is an elevational sectional view of a main portion of a shock absorbing steering apparatus according to a seventh embodiment of the present invention.

Next, a seventh embodiment of the present invention shown in FIG. 20 will be explained.

In this embodiment, a pair of displacement support plates 122 are spaced apart from each other and are secured to the lower surface of the steering column 103, and a connecting wall portion 120 secured to the support bracket 117 is sandwiched by these displacement support plates 122. The other arrangements and functions are the same as those in the above-mentioned first embodiment.

Incidentally, if the height adjusting mechanism for the steering wheel is not needed, lower end(s) of the displacement support plate(s) (FIGS. 11, 13 and 20) may be merely welded to the connecting wall portion 120 formed at a lower end of the support bracket 117, or to the curling plate(s) 144 (FIGS. 15-19).

As mentioned above, it is possible to suppress injury to the driver to a minimum by preventing the strong impact force from acting on the driver upon the secondary collision of the vehicle accident, while maintaining the flexural rigidity for the steering column during the normal operation of the vehicle. Further, since the steering column is sandwiched by the pair of left and right vertical wall portions from both sides, even if the strong impact force is applied to the steering column upon the vehicle collision, the steering column is prevented from shifting in the left-and-right direction. Thus, when an air bag is mounted on the steering wheel, the driver's body can be surely supported by the air bag, thereby surely protecting the driver.

What is claimed is:

1. A shock absorbing steering apparatus comprising:

a steering column into which a steering shaft having a steering wheel at one end thereof is inserted;

a support bracket having a support portion supporting said steering column and an attachment portion attached to a vehicle body, said support portion projecting from said attachment portion and being deformable in an axial direction of said steering column;

a displacement support plate disposed to one side of said support portion in an axial direction of said steering column and having one end secured to an outer peripheral surface of said steering column and another end overlapping with said support portion of said support bracket, said displacement support plate being more easily deformable than said support portion of said support bracket in the axial direction of said steering column; and connecting means for integrally connecting said another end of said displacement support plate to said support portion of said support bracket such that when said steering column is subjected to an axial impact force through said steering wheel, said displacement support plate and said support portion of said support bracket deform in the axial direction of said steering column, with the deformation of said support portion beginning after deformation of said displacement support plate.

2. A shock absorbing steering apparatus according to claim 1, wherein said connecting means constitutes a height adjusting mechanism capable of adjusting a height of said steering wheel with respect to said attachment portion.

3. A shock absorbing steering apparatus according to claim 2, wherein said height adjusting mechanism comprises the support portion of said support bracket, an auxiliary plate secured to the support portion with a space therebetween, a bolt extending through the support portion and said auxiliary plate, an urging plate mounted around said bolt, a nut threaded on one end of said bolt, an urging member abutted against said urging plate, a tilt lever for rocking said urging member, and a link member disposed between said nut and said urging member.

4. A shock absorbing steering apparatus according to claim 2, wherein said height adjusting mechanism comprises a bolt extending through the support portion of said support bracket and protruding therefrom, an urging plate mounted around said bolt at a side of said support portion, a nut threaded on one end of said bolt, and a tilt lever for rotating said nut.

5. A shock absorbing steering apparatus according to claim 2, wherein said height adjusting mechanism comprises a pair of parallel bent plate portions formed on left and right edge portions of the support portion of said support bracket, a cylinder portion horizontally formed on a lower end of said displacement support plate, a bolt extending through the cylinder portion in its axial direction and having one end protruding from one of said bent plate portions and the other end protruding from another bent plate portion, a nut threaded on one end of said bolt, and a tilt lever for rotating said nut or said bolt.

6. A shock absorbing steering apparatus according to claim 2, wherein said attachment portion of said support bracket is secured to the vehicle body above said steering column, and said support portion supports said steering column from underneath.

7. A shock absorbing steering apparatus according to claim 2, wherein a first bent portion is formed in said support bracket, between the attachment portion and the support portion of said support bracket, and a second bent portion directed in generally the same direction as said first bent portion is formed in an intermediate portion of said support portion.

8. A shock absorbing steering apparatus according to claim 6 or 7, wherein said support portion has a U-shape as a whole.

9. A shock absorbing steering apparatus according to claim 2, wherein a bent portion is formed in said displacement support plate, between said one end and said another end of said displacement support plate.

10. A shock absorbing steering apparatus according to claim 2, wherein said displacement support plate has a U-shape as a whole.

11. A shock absorbing steering apparatus comprising:

a steering column into which a steering shaft having a steering wheel at one end is inserted;

a support bracket having a pair of vertical wall portions disposed on both sides of said steering column;

means releasably connecting said support bracket to a vehicle body such that said support bracket can be disconnected from said vehicle body and displaced in an axial direction of said steering column in response to a predetermined force;

a support plate member connecting the pair of vertical wall portions to each other below said steering column;

a displacement support plate disposed to one side of said support plate member in an axial direction of said steering column and having one end secured to said steering column, said displacement support plate being deformable in the axial direction of said steering column in response to force which is less than said predetermined force; and connecting means connecting another end of said displacement support plate to said support plate member, such that when said steering column is subjected to an axial impact force through said steering wheel, said steering column displaces axially, deforming said displacement support plate followed by releasing of the connection of said support bracket to said vehicle body.

12. A shock absorbing steering apparatus according to claim 11, wherein said connecting means constitutes a height adjusting mechanism capable of adjusting a height of said steering wheel with respect to said support bracket, and said height adjusting mechanism comprises a bolt member secured to one of said support plate member and said displacement support plate and extending through an elongated slot extending in an up-and-down direction formed in the other of said support plate member and said displacement support plate, a pinching member engaged by said bolt member and adapted to cooperate with said one of said support plate member and said displacement support plate to pinch said other of said support plate member and said displacement support plate, and an urging means for urging said pinching member toward said other of said support plate member and said displacement support plate.

13. A shock absorbing steering apparatus according to claim 11, wherein said support plate member is disposed substantially in a vertical direction and connects rear end edges of said vertical wall portions to each other.

14. A shock absorbing steering apparatus according to claim 13, wherein said displacement support plate has a U-shape as a whole and is secured to said steering column at a recess defining said U-shape.

15. A shock absorbing steering apparatus comprising:
a steering column into which a steering shaft having a steering wheel at one end is inserted;
a support bracket having an attachment portion attached to a vehicle body and a pair of vertical wall portions disposed on both sides of said steering column;
support plate means, including at least one support plate member, connecting said vertical wall portions to each other below said steering column and deformable in an axial direction of said steering column;
a displacement support plate disposed to one side of said support plate member in an axial direction of said steering column and having one end secured to an outer peripheral surface of said steering column and another end overlapping said support plate member, said displacement support plate being more easily deformable than said support plate means in the axial direction of said steering column; and connecting means for integrally connecting said another end of said displacement support plate to said support plate means, such that when said steering column is subjected to an axial impact force through said steering wheel, said displacement support plate and said support plate means deform in the axial direction of said steering column, with the deformation of said support plate means beginning after deformation of said displacement support plate.

16. A shock absorbing steering apparatus according to claim 15, wherein said connecting means constitutes a height adjusting mechanism capable of adjusting a height of said steering wheel with respect to said support bracket, and said height adjusting mechanism comprises a bolt member secured to one of said support plate member and said displacement support plate and extending through an elongated slot extending in an up-and-down direction formed in the other of said support plate member and said displacement support plate, a pinching member engaged by said bolt member and adapted to cooperate with said one of said support plate member and said displacement support plate to pinch said other of said support plate member and said displacement support plate, and an urging means for urging said pinching member toward said other of said support plate member and said displacement support plate.

* * * * *